(12) United States Patent
Bartel et al.

(10) Patent No.: US 9,616,837 B1
(45) Date of Patent: Apr. 11, 2017

(54) FORWARD FOLDING ROLL BAR ASSEMBLY

(71) Applicant: Excel Industries, Inc., Hesston, KS (US)

(72) Inventors: Harlan John Bartel, North Newton, KS (US); Brian Lee Nebel, Hesston, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 0 days.

(21) Appl. No.: 14/729,789

(22) Filed: Jun. 3, 2015

Related U.S. Application Data

(60) Provisional application No. 62/007,297, filed on Jun. 3, 2014.

(51) Int. Cl.
*B60R 21/13* (2006.01)

(52) U.S. Cl.
CPC ............ *B60R 21/13* (2013.01); *B60R 21/131* (2013.01)

(58) Field of Classification Search
CPC .............................. B60R 21/13; B60R 21/131
See application file for complete search history.

(56) References Cited

U.S. PATENT DOCUMENTS

| | | | |
|---|---|---|---|
| 2,806,618 A | 9/1957 | Cook | |
| 3,289,871 A * | 12/1966 | La Tourneau | B66F 9/07545 280/748 |
| 3,584,897 A | 6/1971 | Frantz et al. | |
| 3,762,761 A * | 10/1973 | Erickson | B66F 9/07545 280/756 |
| 3,841,698 A * | 10/1974 | Stammen | B66F 9/07545 280/755 |
| 3,934,679 A | 1/1976 | Lieptz | |
| 4,120,528 A * | 10/1978 | Samide | B66F 9/07545 296/107.03 |
| 4,666,183 A | 5/1987 | Azzarello | |
| 4,708,389 A | 11/1987 | Maebayashi et al. | |
| 4,840,398 A | 6/1989 | Matthias | |
| 4,877,265 A | 10/1989 | DeBraal et al. | |
| 4,949,991 A | 8/1990 | Ludwig | |
| 5,042,835 A | 8/1991 | Burns | |
| 5,129,676 A | 7/1992 | Sheehan | |
| 5,393,093 A | 2/1995 | Wunsche et al. | |
| 5,503,430 A | 4/1996 | Miki et al. | |
| 5,779,272 A | 7/1998 | Panek et al. | |
| 5,839,758 A | 11/1998 | Finch | |
| 5,842,732 A * | 12/1998 | Daggett | B60J 7/1657 135/88.01 |

(Continued)

FOREIGN PATENT DOCUMENTS

| | | |
|---|---|---|
| EP | 0051100 | 5/1982 |
| EP | 1197399 | 11/2003 |

(Continued)

OTHER PUBLICATIONS

University of Tennessee, Knoxville, Powered Foldable Rops, Senior Project, Document created May 1, 2009, Publication Date Unknown.

*Primary Examiner* — Laura Freedman

(57) ABSTRACT

A roll bar assembly includes an upper portion which is movably mounted at least indirectly to a vehicle frame. The upper portion is able to be secured in a raised position and is also able to fold forward to a folded-forward position for shipping.

11 Claims, 8 Drawing Sheets

(56) References Cited

U.S. PATENT DOCUMENTS

| | | | |
|---|---|---|---|
| 6,322,130 | B1 | 11/2001 | Wanden et al. |
| 7,152,903 | B2 | 12/2006 | Westendorf et al. |
| 7,182,399 | B2 * | 2/2007 | Kamerer ............ B62D 33/0625 |
| | | | 296/102 |
| 7,222,882 | B2 | 5/2007 | Boucher |
| 7,240,472 | B2 * | 7/2007 | Evers .................. A01D 43/063 |
| | | | 56/202 |
| 7,311,330 | B2 | 12/2007 | Kachouh |
| 7,396,047 | B1 | 7/2008 | Young |
| 7,434,379 | B2 | 10/2008 | Nogami et al. |
| 7,438,319 | B2 | 10/2008 | Cooper et al. |
| 7,568,732 | B2 | 8/2009 | Schlup |
| 7,922,201 | B2 | 4/2011 | Kurten et al. |
| 7,971,904 | B2 | 7/2011 | David |
| 7,971,905 | B2 | 7/2011 | McCord et al. |
| 8,016,320 | B2 | 9/2011 | Becker |
| 8,029,019 | B2 | 10/2011 | Schmidt et al. |
| 8,403,363 | B2 | 3/2013 | Duenchel et al. |
| 8,419,061 | B2 | 4/2013 | Fukunaga et al. |
| 8,424,911 | B2 | 4/2013 | Alexander, IV |
| 8,523,225 | B2 | 9/2013 | Reinke et al. |
| 8,528,924 | B1 | 9/2013 | Bartel et al. |
| 8,662,534 | B2 | 3/2014 | Beki |
| 9,266,490 | B2 * | 2/2016 | Johnson ................ B60R 21/13 |
| 2003/0046794 | A1 | 3/2003 | Muir |
| 2005/0212278 | A1 | 9/2005 | Kurten |
| 2005/0217232 | A1 | 10/2005 | Asahara et al. |
| 2006/0001248 | A1 | 1/2006 | Queveau et al. |
| 2007/0094847 | A1 | 5/2007 | Thomson |
| 2007/0209160 | A1 | 9/2007 | Darscheid et al. |
| 2007/0290493 | A1 | 12/2007 | David |
| 2008/0034552 | A1 | 2/2008 | Nguyen |
| 2008/0136155 | A1 | 6/2008 | Janisch et al. |
| 2008/0217897 | A1 | 9/2008 | Latussek et al. |
| 2008/0309058 | A1 | 12/2008 | Kurten |
| 2016/0009238 | A1 * | 1/2016 | Schlup, Jr. ............ B60R 21/131 |
| | | | 280/756 |

FOREIGN PATENT DOCUMENTS

| | | |
|---|---|---|
| EP | 1844990 | 2/2012 |
| FR | 2541953 | 3/1983 |
| GB | 2175259 | 11/1986 |
| JP | 06048259 A * | 2/1994 |
| JP | H0640299 | 2/1994 |
| JP | H07323798 | 12/1995 |
| JP | 2009173240 A * | 8/2009 |
| JP | 2012030648 A * | 2/2012 |

* cited by examiner

FORWARD FOLDING ROLL BAR ASSEMBLY

RELATED APPLICATIONS

This application claims the benefit of U.S. Provisional Patent Application No. 62/007,297 filed on Jun. 3, 2014 which is incorporated herein by reference.

FIELD OF THE INVENTION

This invention relates to a roll bar assembly for a working vehicle which is able to be folded forward in order to facilitate shipping the vehicle within a limited shipping envelope and which is also able to be secured in a raised position.

BACKGROUND OF THE INVENTION

Working vehicles such as riding lawn mowers have often included roll bar assemblies for protecting an operator during a rollover. Typically, such a roll bar assembly includes at least an upper roll bar portion which has two side members and a top member connecting between the side members. The side members of the upper roll bar portion are either fixed to the vehicle frame in a raised position or are pivotably mounted at least indirectly to the vehicle frame by pivot joints. When pivotably mounted, the pivot joints usually allow the upper roll bar portion to be secured in either a raised position for normal operations or a folded-back position for avoiding overhead obstacles. Typically, a working vehicle, such as riding lawn mowers is shipped to a dealer or buyer in a shipping crate. However, neither the raised position nor the folded-back position is suitable for shipping because at least a portion of a roll bar will extend outside a shipping crate. Accordingly, it is often necessary to remove at least the upper portion of a roll bar assembly for shipping. What is needed is a roll bar assembly which is arranged so that the upper portion does not have to be removed for shipping.

SUMMARY

The above stated need is addressed by a roll bar assembly having an upper portion which is able to fold forward for shipping and which is also able to be secured in a raised position. The upper portion is movably mounted at least indirectly to a vehicle frame so that the upper portion is able to be repositioned in a folded-forward position. The upper portion is also able to be secured in at least the raised position.

Accordingly, it is possible for one to receive the working vehicle in a shipping crate with the upper portion of the roll bar folded-forward for shipping, remove the vehicle from the crate, and quickly rearrange the roll bar assembly to the raised position for normal operations.

DETAILED DESCRIPTION

Figure 1:
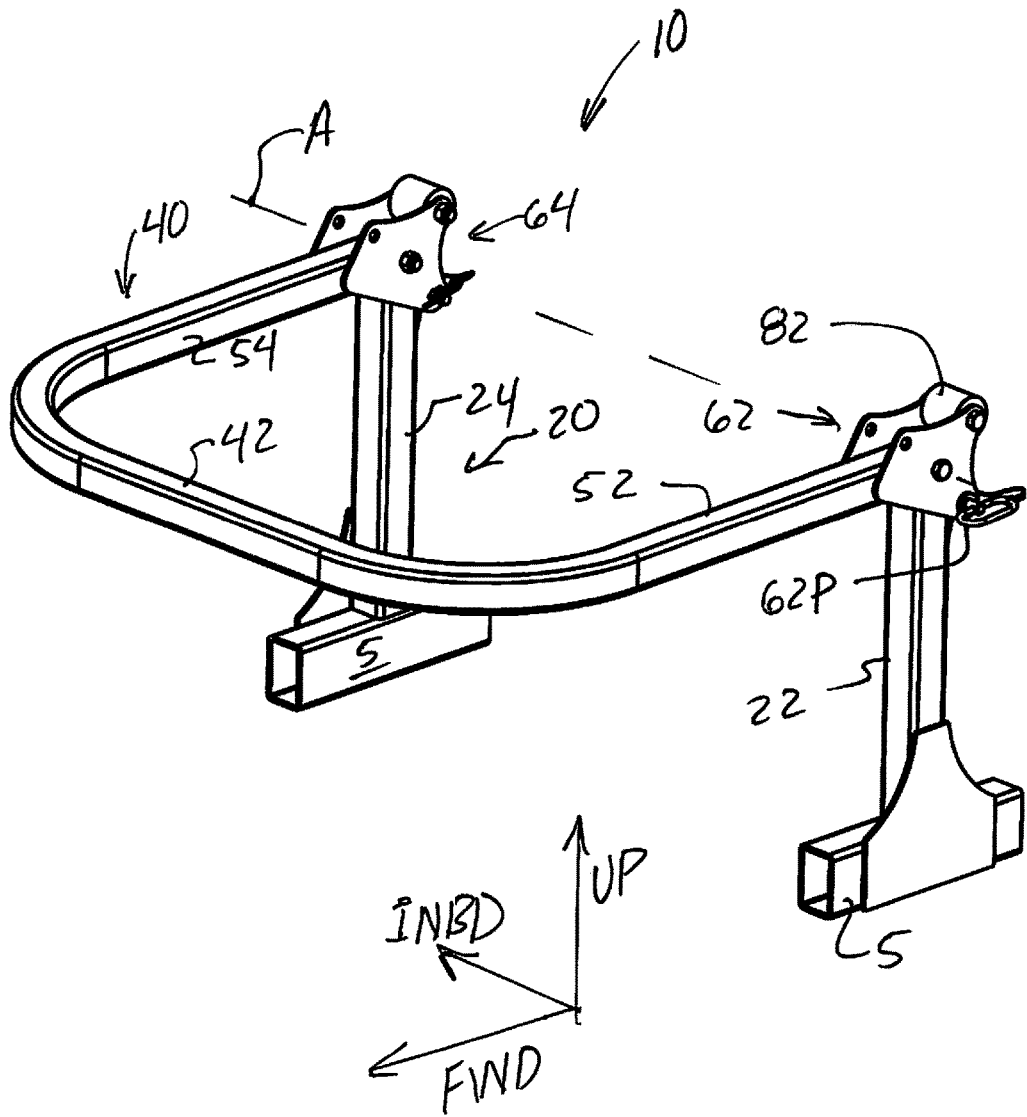
FIG. 1 is a perspective view of the roll bar assembly shown folded forward and shown with the retaining pin installed for securing the upper portion in the folded-forward position.
Figure 6:
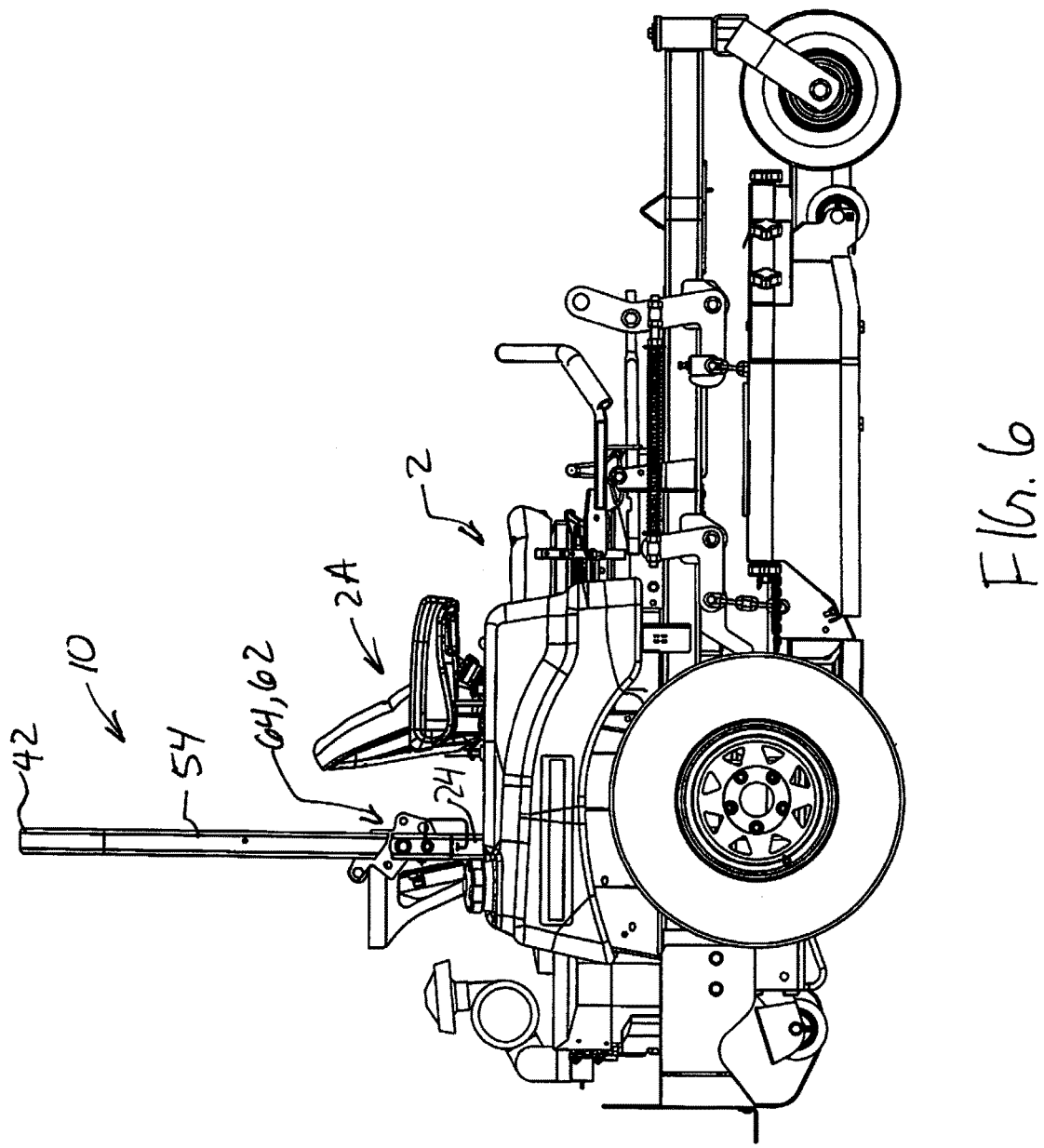
FIG. 6 is a side view of a riding lawn mower showing the roll bar assembly with the upper portion in the raised position.
Figure 7:
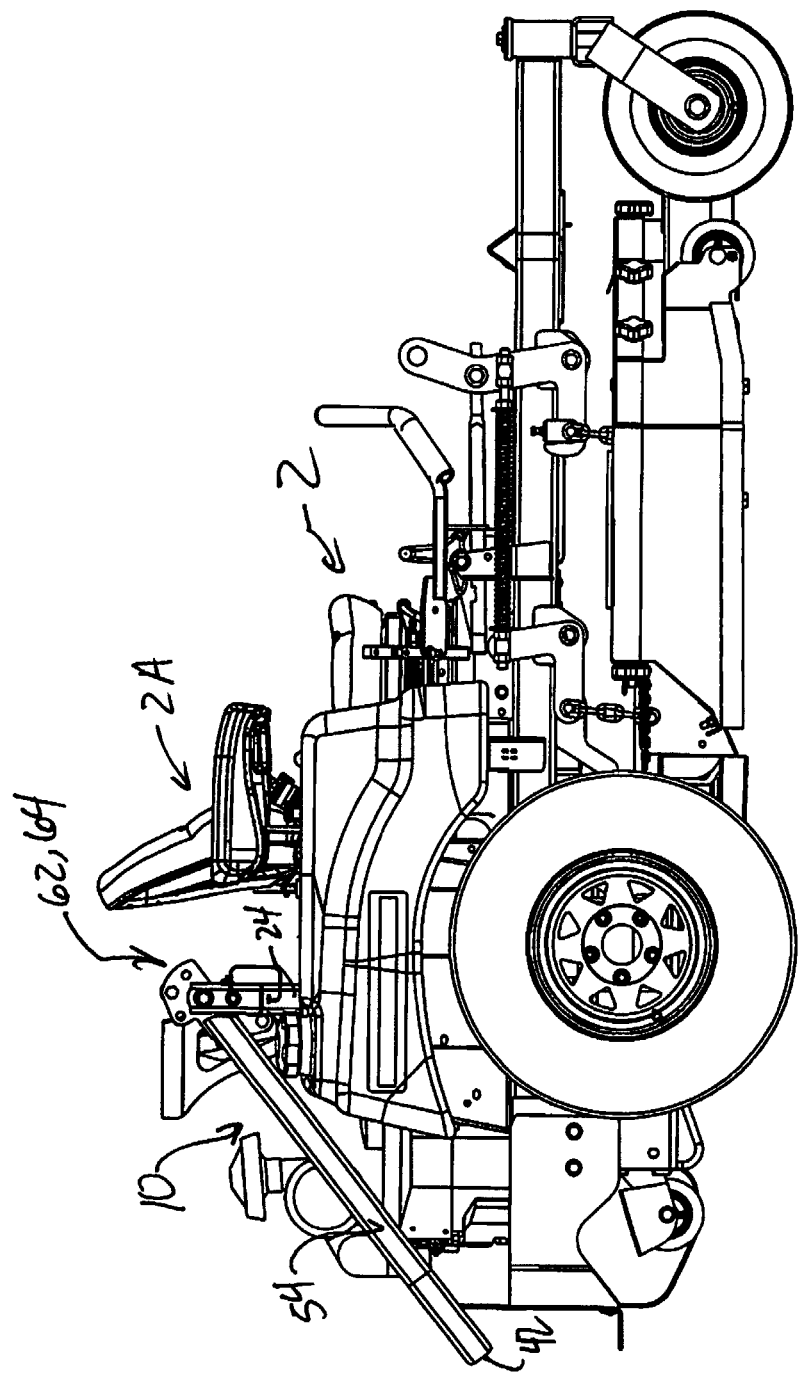
FIG. 7 is a side view of a riding lawn mower showing the roll bar assembly with the upper portion in the folded-back position for avoiding overhead obstacles.
Figure 8:
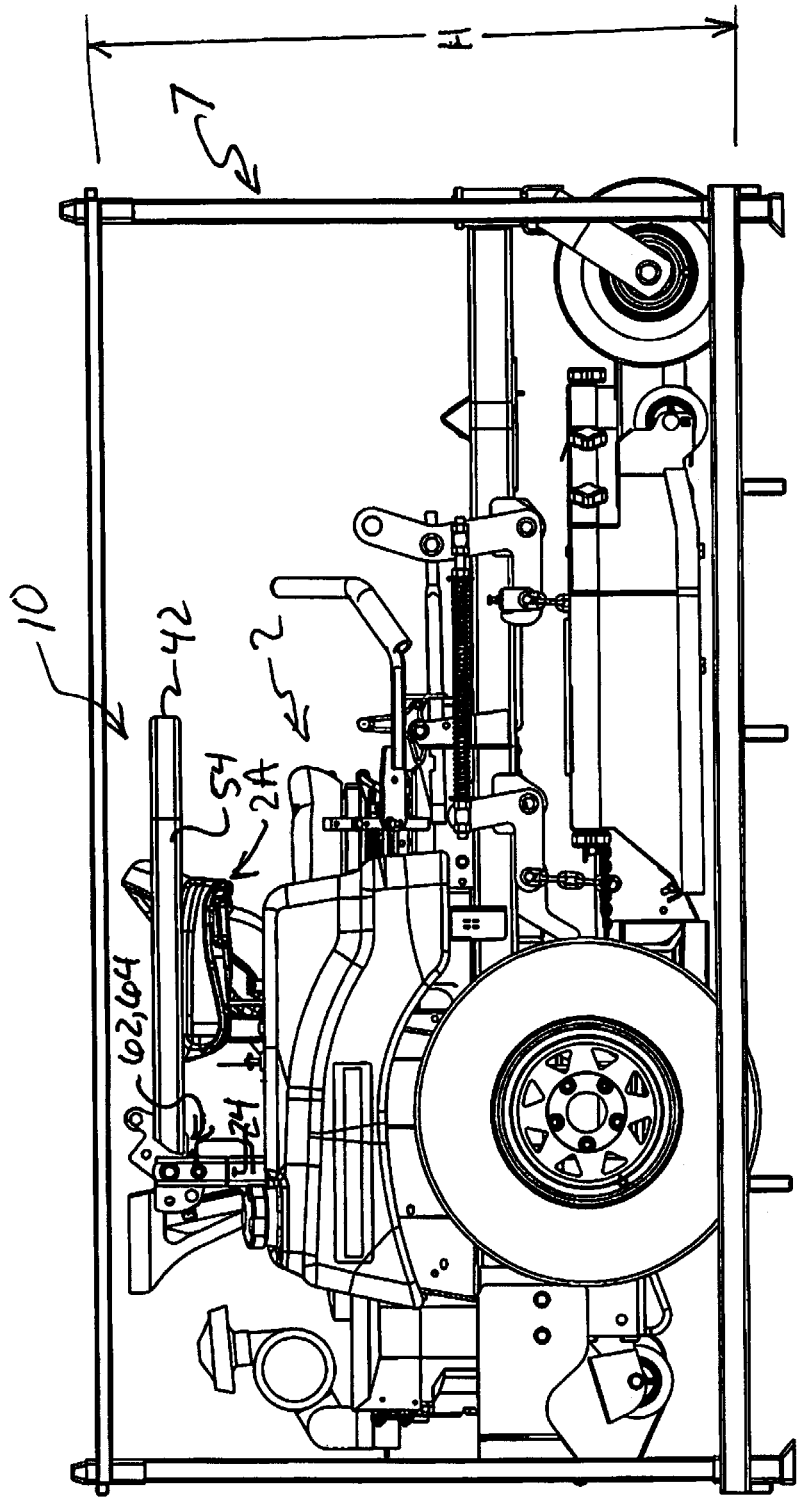
FIG. 8 is a side view of a riding lawn mower with the roll bar assembly, showing the riding lawn mower placed within a shipping crate with the roll bar assembly in the folded-forward position suitable for shipping.

Referring to the drawings, FIGS. 1 and 8 show one embodiment of a forward folding roll bar assembly 10 installed on vehicle frame 5. In FIG. 1, roll bar assembly 10 is in a folded-forward position suitable for shipping. In FIG. 8 one embodiment of roll bar assembly 10 is shown installed on a riding lawn mower 2 in the folded-forward position. In FIG. 8 lawn mower 2 and roll bar assembly 10 are also shown contained within a shipping crate 7. The limits of shipping crate 7 shown in FIG. 8 define a shipping envelope. This shipping envelope dictates a maximum vehicle height H which is the maximum height of a vehicle which can fit within shipping crate 7. In this example, vehicle frame 5 shown in FIG. 1 may be the frame of any type of vehicle such as a riding lawn mower, a lawn tractor or other such vehicle which is likely to be exposed to a risk of a rollover. As can be seen in FIGS. 6-8, in this one embodiment, roll bar assembly 10 is mounted to riding lawn mower 2 in a location such that roll bar assembly 10 is not located forward of an operator seat 2A and in this example is located behind operator seat 2A.

As can be seen in FIG. 1, in this one embodiment roll bar assembly 10 includes a lower portion 20 and an upper portion 40. As shown in FIG. 1, lower portion 20 includes, two generally raised spaced lower side members 22 and 24 which are fixed to frame 5. The skilled reader will appreciate that lower side members 22 and 24 may be replaced by members or features associated with the frame of a vehicle. In this one embodiment, upper portion 40 includes a top member 42 and two upper right and left side members 52 and 54 which are integral with and extend from top member 42 thereby defining a "U" shaped structure typical of a roll bar. In this example, right and left side members 52 and 54 of upper portion 40 are connected to lower right and left side members 22 and 24 by right and left pivot joints 62 and 64 respectively. Although pivot joints 62 and 64 are used in this embodiment, other embodiments could have connections between upper members 52 and 54 and the lower members 22 and 24 which are movable or re-positionable without having pivot joints. Pivot joints 62 and 64 make it possible for upper portion 40 to pivot with respect to lower portion 20 around axis A indicated in FIG. 1. However, as shown in FIG. 1, in this one embodiment, upper portion 40 is able to be secured in the folded-forward position by retaining pins 62P and 64P as will be described in greater detail below.

Figure 2:
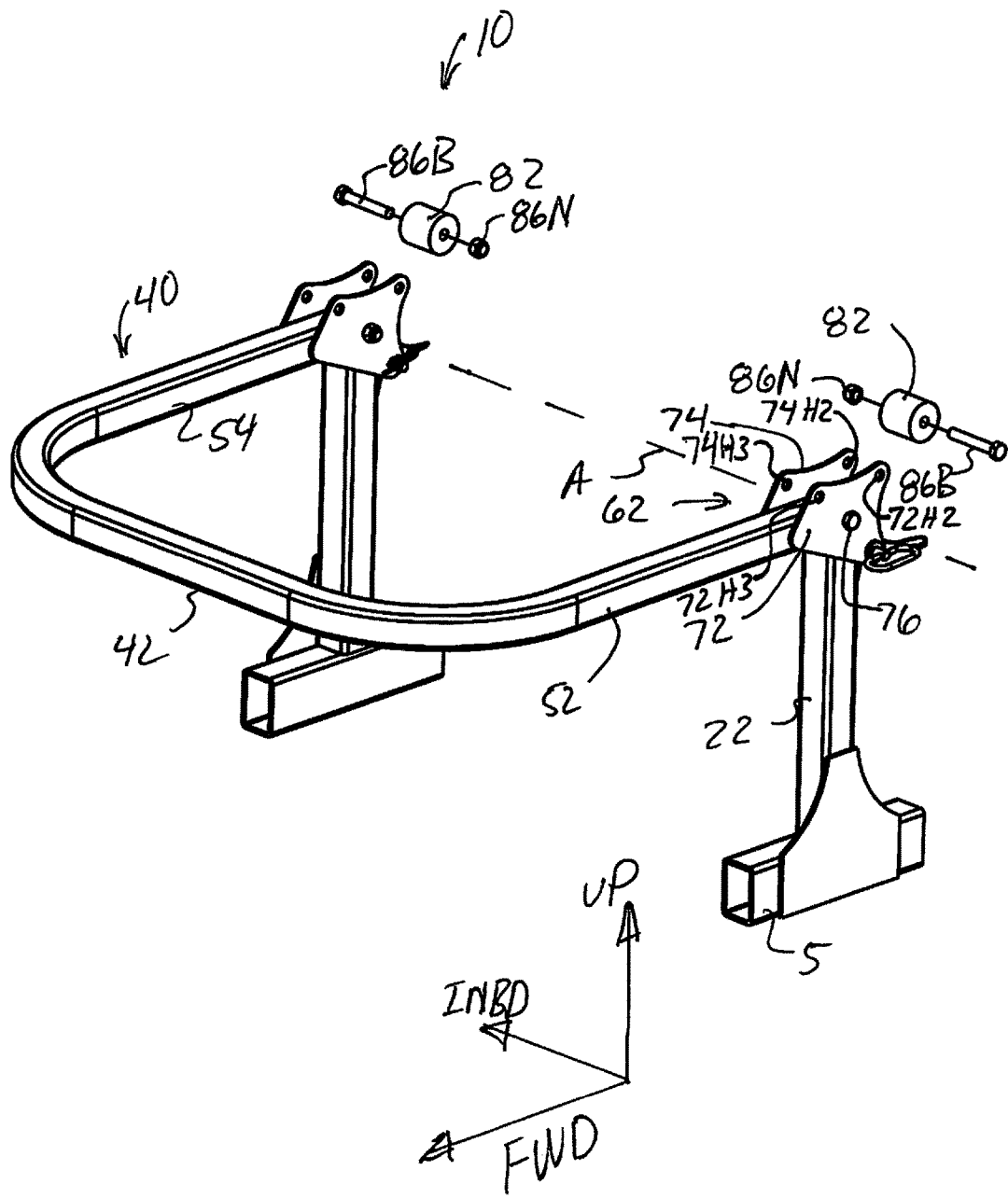
FIG. 2 is a perspective view of the roll bar assembly showing the upper portion folded forward and shown with the bumper retaining bolt and the bumper removed.

FIG. 2 is a perspective view of roll bar assembly 10 showing right upper side member 52, right lower side member 22 and right side pivot joint 62 as well as corresponding members on the left side of roll bar assembly 10. The skilled reader will understand that by considering one side of roll bar assembly 10, it is possible to understand the configuration and function of both sides of roll bar assembly 10. For this one embodiment, the elements described herein for the right side of roll bar assembly 10 should be understood as being present on the left side of roll bar assembly 10. As shown in FIG. 1, right lower side member 22 is fixed to frame 5. In FIG. 2, right upper side member 52 is folded forward as in FIG. 1. As can be seen in FIG. 2, in this example, a pair of opposite symmetrical index plates 72 and 74 are fixed to opposite side of right upper side member 52. In this example, a fastener 76 is received through corresponding holes near the center portion of index plates 72 and 74 and by a bushing 32 which is fixed to lower side member 22. The skilled reader will appreciate that index plates 72 and 74 may be replaced by a single plate or fitting. Fastener 76 is aligned on transverse axis A indicated in FIGS. 1 and 2. Bushing 32, index plates 72 and 74 and fastener 76 cooperate to provide a joint around which right upper side member 52 and by extension upper portion 40 may pivot about axis A.

FIG. 2 also shows a bumper 82 which is removed when compared to FIG. 1. Although nearly all of the components shown and described here are preferably fashioned from steel or some other similar high strength material, bumper 82 is preferably fashioned from a resilient rubber but could have a center metallic bushing. As can be seen in FIG. 2, bumper 82 can be mounted to joint assembly 62 by a bolt 86B and a nut 86N. Bumper 82, bolt 86B and nut 86N are shown in an exploded relationship in FIG. 2. As can also be seen in FIG. 2, a retaining pin 62P is inserted through corresponding opposite holes in index plates 72 and 74 as well as a bore presented by a lug 28 (shown in FIG. 4) fixed to the back surface of right lower member 22. When retaining pin 62P is inserted as shown in FIG. 2, upper portion 40 is secured in the folded-forward position shown in FIG. 1. This position is suitable for shipping the vehicle in a shipping crate having a limited envelope as is shown in FIG. 8. As FIG. 2 illustrates, the removal of bumper 82 is necessary if upper portion 40 is to be folded up to the raised position. As is not shown in FIG. 2, but which is more evident when referring to FIG. 3, pin 62P must also removed prior to rotating right upper side member 52 (and thus upper portion 40) to the raised position shown in FIG. 3.

Figure 3:
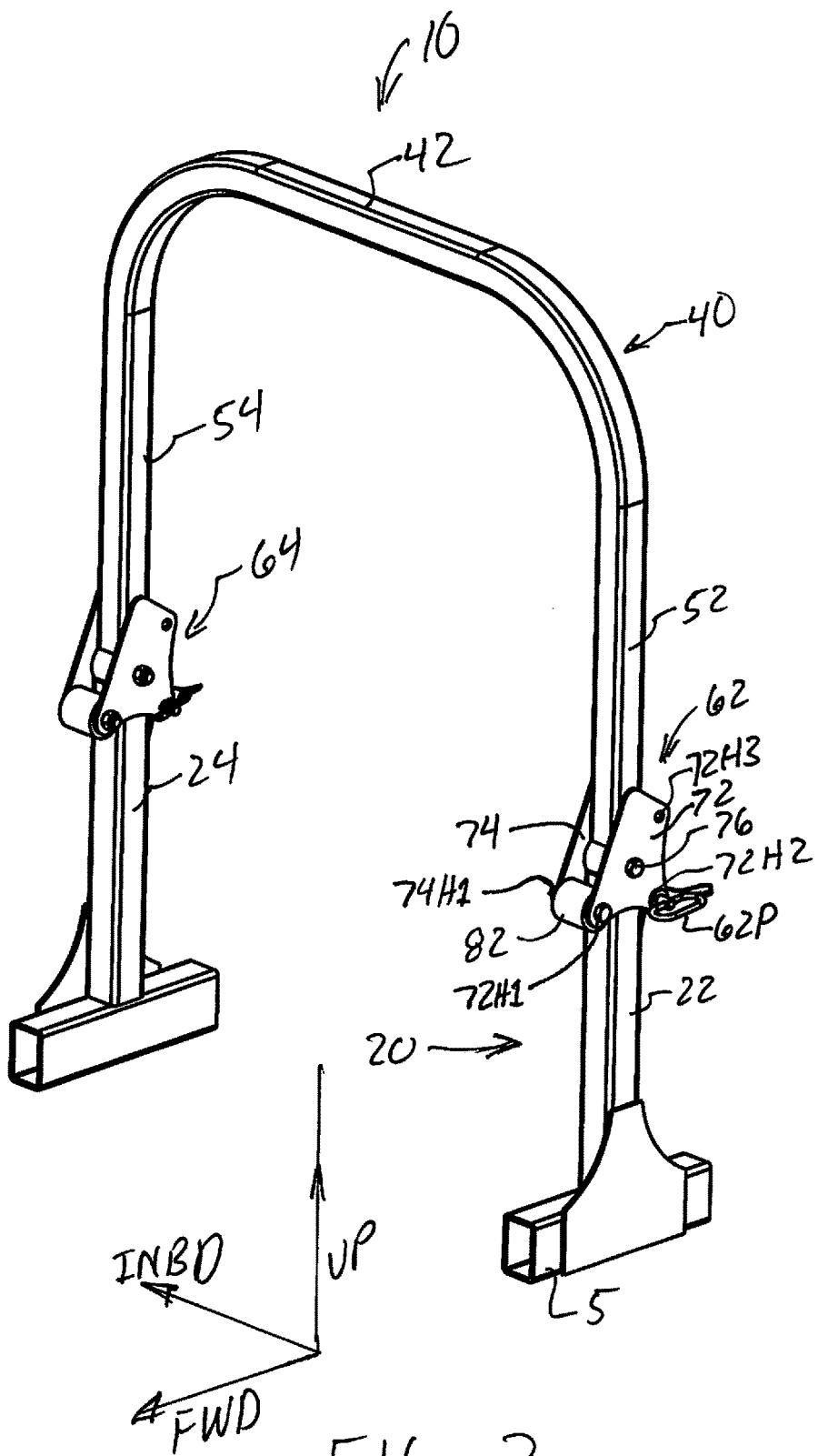
FIG. 3 is a forward perspective view of the roll bar assembly showing the upper portion in the raised position and shown with the bumper retaining bolt and the bumper installed and also shown with the retaining pin installed for securing the upper portion in the raised position.
Figure 4:
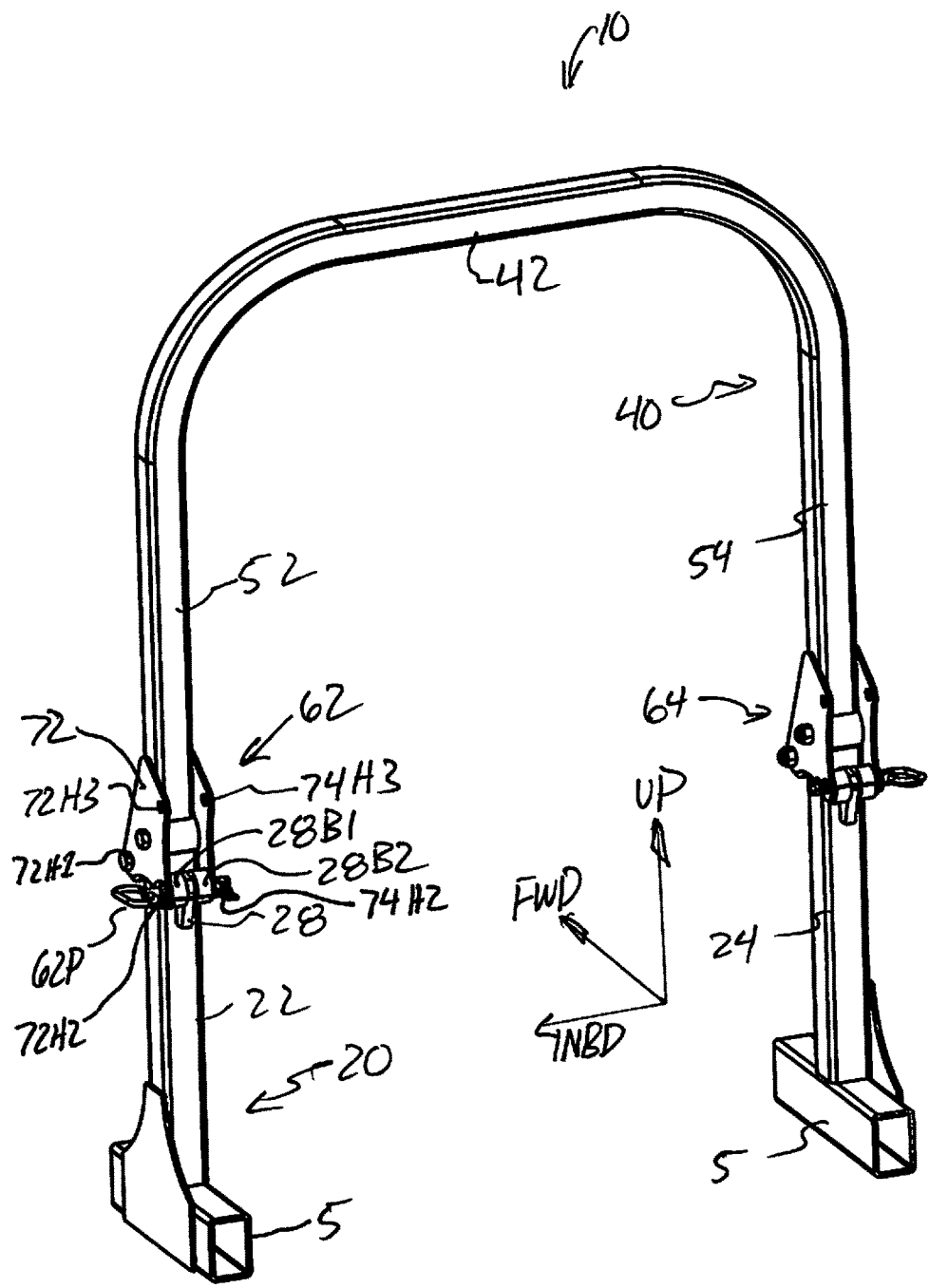
FIG. 4 is a rear perspective view of the roll bar assembly showing the upper portion in the raised position and shown with the bumper retaining bolt and the bumper installed and also shown with the retaining pin installed for securing the upper portion in the raised position.

FIGS. 3 and 4 illustrate upper portion 40 secured in the raised position which is suitable for normal operations. In FIGS. 3 and 4, upper portion 40 is generally upright. However, in some embodiments, upper portion 40 may also be slanted forward to some degree. Generally, the raised position for upper portion 40 shown in FIGS. 3 and 4 is intended for normal operations and is intended to help protect an operator during a roll-over. As can be seen in FIGS. 3 and 4, bumper 82 has been installed by bolt 86B and nut 86N in a first corresponding opposite set of first index plate holes 72H1 and 74H1. Also in FIG. 3, retaining pin 62P has been installed in second corresponding opposite sets of index plate holes 72H2 and 74H2 and in lugs 28 (shown in FIG. 4) to secure upper portion 40 in the raised position. Preferably, when installed as shown in FIG. 3, bumper 82 is compressed.

The method for rearranging roll bar assembly 10 from the folded-forward position to the raised position may be best understood by referring to FIGS. 2 and 3. For a mechanic or operator to change roll bar assembly 10 from the folded-forward position shown in FIG. 2 to the raised position shown in FIG. 3, the mechanic or operator would do the following: (a) remove pins 62P from first holes 72H1 and 74H1 and bushings 28, (b) rotate upper portion 40 at least past vertical, (c) install bumpers 82 in first holes 72H1 and 74H1 using bolts 86B and nuts 86N as shown in FIG. 3, and (d) rotate upper portion 40 to the position shown in FIG. 3 thereby compressing bumpers 82 and install pins 62 in second holes 72H2 and 74H2 and lugs 28. The compression of bumpers 82 in the raised position reduces rattling in joints 62 and 64.

Figure 5:
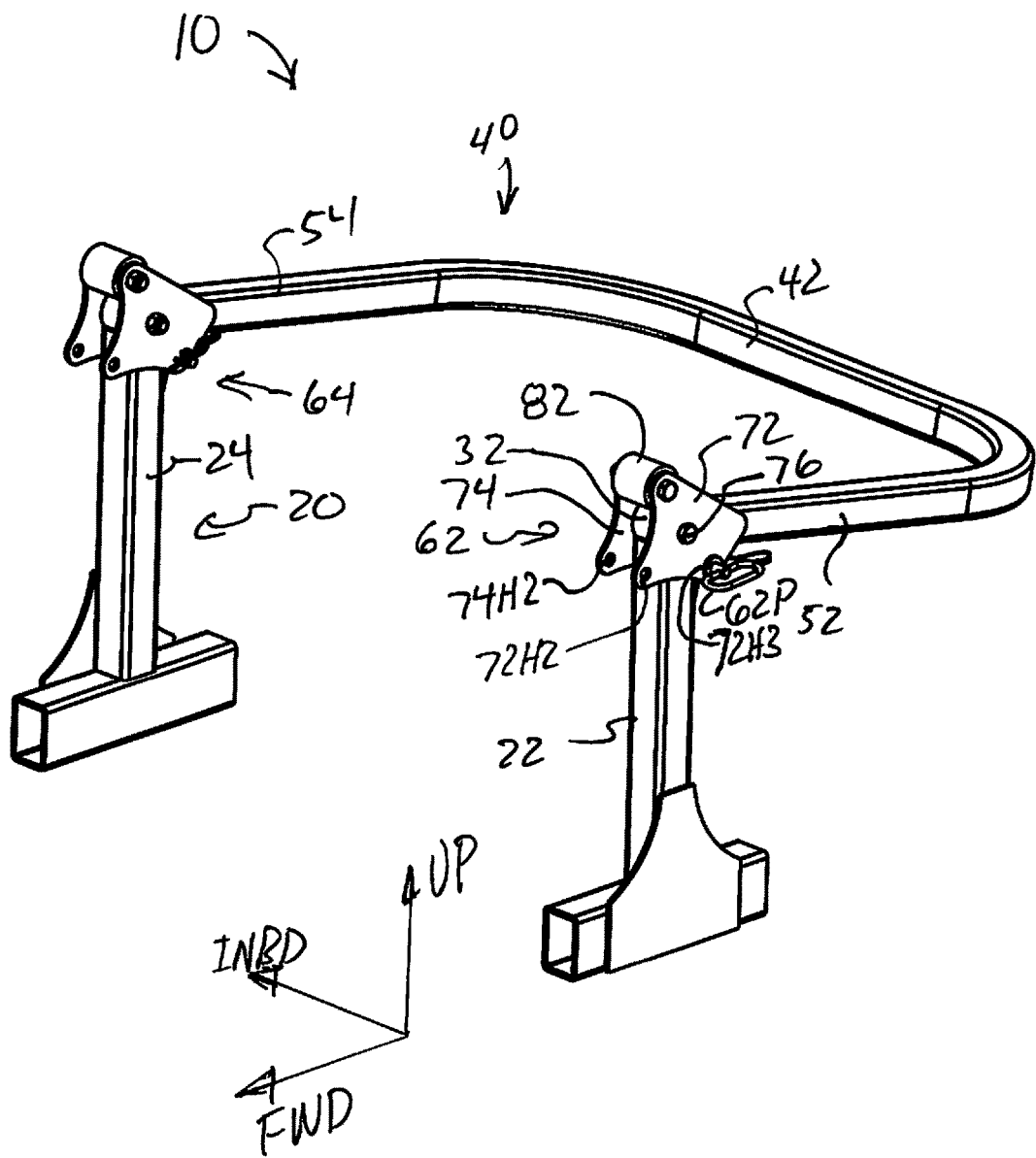
FIG. 5 is a perspective view of the roll bar assembly showing the upper portion folded back and shown with the bumper retaining bolt and the bumper installed and also shown with the retaining pin installed for securing the upper portion in the folded-back position.

FIG. 5 illustrates the method for folding upper portion 40 back to a position suitable for avoiding overhead obstacles. As can be seen in FIG. 4, prior to rotating upper right member 52 clockwise as viewed in FIG. 4 toward the folded back position shown in FIG. 5, it is first necessary to remove pins 62P from second holes 72H2 and 74H2 and lugs 28. Once pins 62P are removed, it is possible to rotate upper portion 40 to the folded-back position shown in FIG. 5. Once upper portion 40 is in the folded back position shown in FIG. 5, it is possible to install pins 62P to secure upper portion 40 in the folded-back position.

FIG. 4 shows two rubber bumpers 28B1 and 28B2 which are fixed to opposite sides of lug 28. Bumpers 28B1 and 28B2 present resilient upper surfaces which extend above lug 28. Accordingly, in this one embodiment, when upper portion 40 is moved to the folded back position shown in FIG. 5, upper portion 40 preferably compresses rubber bumpers 28B1 and 28B2. This action reduces the tendency of joints 62 and 64 to rattle when upper portion 40 is in the folded-back position.

As can be understood from the above description and the figures referenced above, roll bar assembly 10 meets the needs noted above by providing a roll bar assembly which is able to be easily arranged in a folded-forward position suitable for shipping as described above without having to disassemble the roll bar assembly and store and secure loose parts within the shipping envelope as shown in FIG. 8. By way of example, by using this capability, it would be possible to ship a group of roll-bar equipped (ROPS equipped) riding lawn mowers so that each of the shipped mowers would have an overall shipping height not greater than approximately 33 or perhaps 34 inches. This allows for the stacking of crated riding lawn mowers in greater numbers in a standard shipping configuration thereby making it possible to ship roll bar equipped riding mowers with considerably lower shipping costs. The applicants believe that it would be possible to stack crated mowers three units high if the shipping height (indicated as H in FIG. 8) of each mower were to be limited to approximately 33 or 34 inches. With commonly used shipping configurations, the applicants believe that a three high stack height which is at or below approximately 99 inches would be preferable. Moreover, crated mowers having higher profiles and roll bars could be stacked two deep with forward-folding capability where otherwise two deep stacking might not be possible. The arrangement described above also reduces the likelihood that parts will be misplaced or damaged during shipping and decreases the effort and skill needed to reassemble the roll bar assembly for use after it has arrived at its shipping destination.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A roll bar assembly for a vehicle having a vehicle frame and including an operator's seat mounted to the frame, the operator's seat having a seatback, the roll bar assembly comprising:
   (a) a roll bar including at least one member which is movably connected at least indirectly to the vehicle frame, the roll bar being able to move between a raised position and a folded-back position, the roll bar also being able to move between the raised position and a folded-forward position, the folded-forward position being a position in which no portion of the roll bar extends above the seatback of the operator's seat, and,
   (b) the roll bar also being able to be secured in the raised position and in at least one other position selected from the group consisting of the folded-forward position and the folded-back position.

2. The roll bar assembly of claim 1, wherein:
the roll bar is able to be secured in the raised position, the folded-back position and the folded-forward position.

3. The roll bar assembly of claim 1, wherein;
the roll bar includes two spaced upper side members and the two spaced upper side members are pivotably mounted to two spaced lower side members for rotation around a roll bar pivot axis, the two spaced lower side members being at least indirectly fixed to the vehicle frame, and at least one of the upper side members of the roll bar or at least one of the lower side members presents a transverse bore that is spaced away from the roll bar pivot axis and the at least one upper or lower side member which is pivotably connected to the at least one upper or lower side member having the transverse bore further includes at least one index plate, the at least one index plate presenting at least one hole which aligns with the transverse bore for receiving a securing pin when the roll bar is in a pre-selected position thereby releasably securing the roll bar in the pre-selected position.

4. The roll bar assembly of claim 3, wherein:
the at least one index plate presents a hole which aligns with the transverse bore for receiving a securing pin when the roll bar is in the raised position and the at least one index plate presents a second hole which aligns with the transverse bore for receiving a securing pin when the roll bar is in one other position selected from the group consisting of the folded-forward position and the folded-back position.

5. A roll bar assembly for a vehicle having a vehicle frame, the roll bar assembly comprising:
   a roll bar including two spaced upper side members, the two spaced upper side members being pivotably mounted to two spaced lower side members which are at least indirectly fixed to the vehicle frame, the roll bar being able to pivot between a raised position and a folded-back position and between the raised position and a folded-forward position by pivoting on a roll bar pivot axis, at least one of the upper side members or at least one of the lower side members presenting a transverse bore that is spaced away from the roll bar pivot axis, the side member which is pivotably connected to the side member having the transverse bore further including at least one index plate, the at least one index plate presenting a hole which aligns with the transverse bore for receiving a securing pin when the roll bar is in the raised position, and the at least one index plate also presenting a hole which aligns with the transverse bore for receiving a securing pin when the roll bar is in the folded-back position.

6. The roll bar assembly of claim 5, wherein:
the at least one index plate also presents a hole which aligns with the transverse bore for receiving a securing pin when the roll bar is in the folded-forward position.

7. A roll bar assembly for a vehicle including a frame and an operator's seat mounted to the frame, the operator's seat including a seatback, the roll bar assembly comprising:
   (a) a lower portion including at least one lower side member which is able to be fixed at least indirectly to the vehicle frame at a location on the frame which is not forward of an operator's seat,
   (b) an upper portion including at least one upper side member which is pivotably connected by at least one pivot joint to the at least one lower side member,
   (c) the at least one pivot joint arranged so that the upper portion is able to pivot about an upper portion pivot axis between a raised position and a folded-forward position such that no part of the upper portion extends above the seatback of the operator's seat, and,
   (d) at least one of the at least one upper side member or the at least one lower side member presenting a transverse bore that is spaced away from the upper portion pivot axis and the at least one upper or lower side member which is pivotably connected to the at least one upper or lower side member presenting the transverse bore further including at least one index plate, the at least one index plate presenting at least one hole which aligns with the transverse bore for receiving a securing pin when the upper portion is in at least the raised position for securing the upper portion in the raised position.

8. The roll bar assembly of claim 7, wherein:
the upper portion is able to be pivoted into a folded-back position and secured in the folded-back position.

9. The roll bar assembly of claim 8, wherein:
the upper portion is able to be secured in the folded-forward position.

10. The roll bar assembly of claim 7, wherein:
the upper portion is able to be secured in the folded-forward position.

11. A roll bar assembly for a vehicle having an operator's seat, the roll bar assembly comprising:
   (a) a lower portion including two spaced lower side members which are fixed at least indirectly to a vehicle frame at a location behind the operator's seat and having a top end located below a top of the operator's seat,
   (b) an upper portion including two ends that are connected by pivot joints to the two spaced lower side members, respectively,
   (c) the pivot joints arranged so that the upper portion is able to pivot between a raised position, a folded-forward position and a folded-back position, and a securing mechanism mounted to at least one of the upper or lower side members to secure the upper portion in the raised position, in the folded-back position, or in the folded-forward position so that no part of the upper portion extends above the seatback when in the folded-forward position.

* * * * *